US005686775A

United States Patent [19]

Veil et al.

[11] Patent Number: 5,686,775

[45] Date of Patent: Nov. 11, 1997

[54] BRUSH HOLDER FOR AN ELECTRICAL MACHINE

[75] Inventors: Tobias Veil, Wuerzburg; Werner Goeb, Kuernach; Siegfried Heger, Wuerzburg; Burkard Roechner, Wuerzburg; Thomas Drexlmaier, Wuerzburg, all of Germany

[73] Assignee: Siemens Aktiengesellschaft, München, Germany

[21] Appl. No.: 451,823

[22] Filed: May 26, 1995

[30] Foreign Application Priority Data

| | | | |
|---|---|---|---|
| May 27, 1994 | [DE] | Germany | 94 08 670.2 |
| Aug. 19, 1994 | [DE] | Germany | 94 13 421.9 |

[51] Int. Cl.$^6$ .......... H02K 13/00

[52] U.S. Cl. .......... 310/239; 310/242; 310/238; 310/245

[58] Field of Search .......... 310/239, 241, 310/242, 245, 246, 248

[56] References Cited

U.S. PATENT DOCUMENTS

| | | | |
|---|---|---|---|
| 4,059,776 | 11/1977 | Schreiber et al. | 310/242 |
| 4,381,466 | 4/1983 | Adam et al. | 310/239 |
| 5,315,199 | 5/1994 | McCracken et al. | 310/239 |

*Primary Examiner*—Clayton E. Laballe
*Assistant Examiner*—Timothy A. J. Williams
*Attorney, Agent, or Firm*—Kenyon & Kenyon

[57] ABSTRACT

A brush holder for an electrical machine, and in particular a hammer brush holder, can include a carbon brush inserted with one of its ends provided with a brush shunt into a pot-shaped receptacle part of the brush holder. The carbon brush is retained in the receptacle part by means of clamping. A reliable clamping of the carbon brush is guaranteed by providing a scraper rib on at least one side wall of the receptacle part and designing it to ascend from the entry slot of the receptacle part toward its pot-like bottom with respect to its height and/or its width pointing into the receiving space of the receptacle part. The brush holder may be manufactured from plastic, and the carbon brush is inserted with a clamp locking force fit into a receiving opening of the brush holder. In order to be able to guarantee a secure fixed seating in any case in spite of the unavoidable tolerances in the case of mass production, at least one side wall of the insertion opening having a protruding scraper rib comes to rest against the carbon brush. The scraper rib is arranged or designed to make contact with the carbon brush in a way that allows lateral and/or vertical variation with increasing insertion depth of the carbon brush.

33 Claims, 3 Drawing Sheets

BRUSH HOLDER FOR AN ELECTRICAL MACHINE

BACKGROUND OF THE INVENTION

The present invention relates to a brash holder for an electrical machine, in particular a hammer brash holder, in which a carbon brush is inserted with its one end provided with a brash shunt into a pot-shaped receptacle part of the brush holder and is retained in this receptacle part by means of clamping. The carbon brush may also be inserted with one end between side walls of a receiving opening of the brush holder with a clamp locking force fit.

German Patent Document No. C3-28 14 009 discloses a plastic hammer brush holder for an electrical machine. The brush is able to be inserted with its one end between side walls of a receiving opening of the brush holder with a clamp locking force fit. A suppressor choke is retained on the top-side brush back of the hammer brush holder by integrally forming (or premolding) at least partially elastic attachment pockets. These pockets have been adapted to different aliametric dimensions of the winding ends of the suppressor choke, in one piece at the ends of the brash holder back. This allows the winding ends to be able to be securely inserted into the attachment pockets to provide a fixed, final mounting support for the suppressor choke.

In the case of commercially available electrical machines provided with a hammer brash holder, the carbon brash is inserted with its one end into a pot-shaped receptacle part of the hammer brush holder. The receptacle part is designed and dimension to hold the carbon brush through clamping action. Often only an inadequate clamping effect is achieved when the applicable end of the carbon brash is introduced into the receptacle.

SUMMARY OF THE INVENTION

The present invention further develops a brush holder of this type to guarantee a reliable clamping of the carbon brush.

The brush holder according to an embodiment of the present invention includes a scraper rib on at least one side wall of the receptacle part. The scraper rib is designed to ascend (or extend) from the entry slot of the receptacle part toward its pot-like bottom with respect to its height and/or its width pointing into the receiving space of the receptacle part. Since the increasing height and/or width of the scraper rib causes new material of the carbon brush to always be removed (i.e., abrasively cut) by the scraper rib when the carbon brush is pressed into the receptacle part and thus to be clamped, it is guaranteed that the scraper rib is pressed over its entire length against the carbon brush. This achieves a perfect clamping of the carbon brush.

A free-from-play clamping of the carbon brush in the receptacle part is achieved, given a rectangular cross-sectional shape of the same, by providing scraper rips that are spaced apart from each other on at least one of the longer side walls of the receptacle part. The spaced apart configuration of the scraper ribs prevents the carbon brush from tilting around its longitudinal axis.

The clamping effect can be improved still further by designing the scraper rib to ascend cortically from the entry slot toward the pot-like bottom of the receptacle part. Overall, therefore, the contact surface between this scraper rib and the carbon brush is enlarged by designing the scraper rib in this manner and, consequently, an even greater clamping force is achieved. The height and/or width of the scraper rib can also be increased in steps.

According to an embodiment of the present invention, it has proven to be especially favorable for the maximum width of the scraper rib at the pot-like bottom to amount to 5% to 50%, and preferably 7% to 10% of the width of the respective side wall of the receptacle part.

In accordance with an embodiment of the present invention, a secure fixed seating of the carbon brush in the insertion opening of the plastic brush holder can be reliably guaranteed in any case, even while allowing for unavoidable tolerances in the case of a mass production and even under rough operational use. In this embodiment, at least one side wall of the insertion opening having a protruding scraper rib comes to rest against the carbon brush, and the scraper rib is arranged or designed to make contact with the carbon brush in a way that allows lateral and/or vertical variation with increasing insertion depth of the carbon brush.

Even when one allows for material of the carbon brash being removed (or abrasively cut) when the carbon brash is inserted in the region of the pressing scraper rib, and particularly in the case of too close tolerances of the receiving opening, the arrangement or design of the scraper ribs according to the present invention guarantees a reliable clamp locking force fit in any case. This is provided even when the carbon brash is pressed in further, since in each case a virgin counter pressing surface is available for the scraper rib when the carbon brush is pressed in.

The contact pressure guaranteed over the entire insertion depth can be achieved by a laterally variable arrangement of the scraper rib. In particular, an arrangement is provided that runs at an angle to the insertion direction, especially in the case of a scraper rib that runs constantly in the pressing direction, since the height (or level) of the protruding scraper rib increases with respect to the carbon brush.

Especially simple and effective laterally variable arrangements or designs of the scraper rib can be realized by a scraper rib that widens conically or triangularly with increasing insertion depth or by scraper rib parts that are laterally displaced from one another in the insertion direction.

BRIEF DESCRIPTION OF THE DRAWINGS

The present invention, including advantageous embodiments and refinements, will be described and clarified in greater detail in the following on the basis of schematically depicted exemplary embodiments in the drawings.

DETAILED DESCRIPTION

Figure 1:
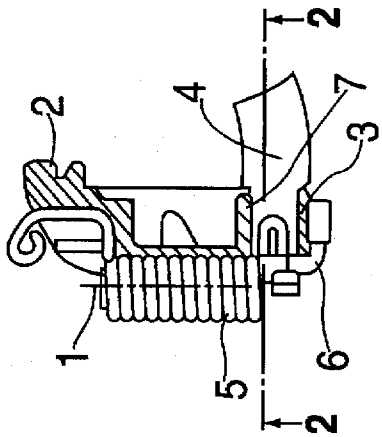
FIG. 1 illustrates a hammer brash holder in a longitudinal cross section according to an embodiment of the present invention.

The plastic retaining member of a hammer brush holder is designated in the drawings by reference numeral 1. This retaining member 1 is provided at its one end with a hollow bearing depression 2 for a knife-edge bearing arrangement of the brush holder on the housing of an electrical machine. At the opposite end, the retaining member 1 has a pot-shaped receptacle part 3 for a carbon brush 4. A resistor (or inductor or reactance coil) 5, which is connected at one end to the brush shunt 6 of the carbon brush 4, is mounted on the back of the retaining member 1.

Figure 2:
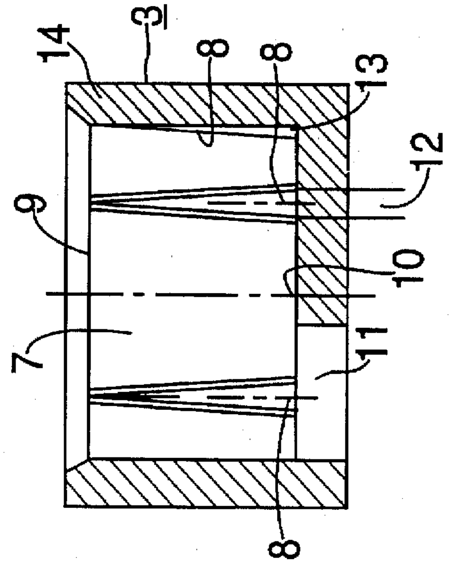
FIG. 2 illustrates the receptacle part of the hammer brash holder in a section along the line II—II illustrated in FIG. 1, in an enlarged representation.
Figure 3:
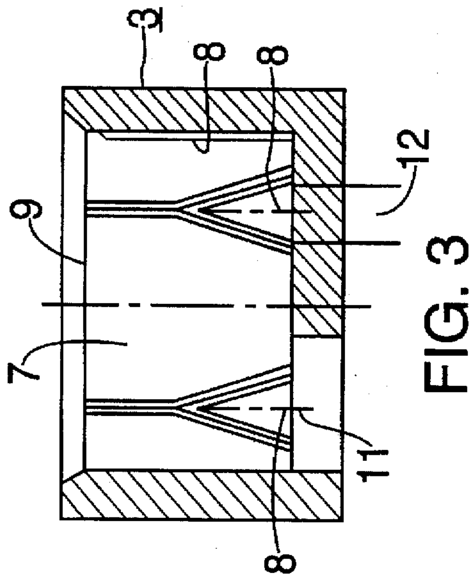
FIG. 3 illustrates another variant of an embodiment of the present invention in an enlarged representation.

As illustrated in FIG. 2, two scraper ribs 8 are provided on at least one side wall 7 of the receptacle part 3. These scraper ribs 8 are designed to ascend conically from the entry slot 9 of the receptacle part 3 toward its pot-like bottom 10. Thus, the scraper ribs 8 in the plane of the side wall 7 have their smallest width near the entry slot 9 and a maximum width 12 of the scraper ribs 8 near the pot-like bottom. Furthermore, the height 13 of the scraper ribs 8 projecting into the receiving space of the receptacle part 3 can be the smallest near the entry slot 9 and rise to its largest value toward the pot-like bottom 10. In addition to being provided on the one side wall 7, scraper ribs 8 can also be provided on another side wall 14, or also on all side walls of the receptacle part 3. The height and/or width of the scraper rib 8 can rise continually or in steps over the entire length of the scraper rib 8. Moreover, the rise can be only over one partial area of the scraper rib length, this partial area then being situated toward the pot-like bottom 10 (FIG. 3).

A push-through bushing opening 11 is formed in the pot-like bottom 10 of the receptacle part 3 for the brush shunt 6 of the carbon brush 4.

When the applicable end of the carbon brush 4 is pressed into the receptacle part 3, it initially meets with the scraper ribs 8 which are sharply pointed in the area of the entry slot 9. When the carbon brush 4 is pressed in, the scraper ribs 8 bury or dig themselves into the material of the carbon brush 4. Due to their increasing width and height, the scraper ribs 8 continually remove new material from the carbon brush over the entire extent or range of the path for inserting the carbon brush 4 into the receptacle part, so that a secure fitting is achieved between the scraper ribs 8 and the carbon brush 4. This also results then in the reliable press fitting of the carbon brush 4 in the receptacle part 3.

Figure 4:
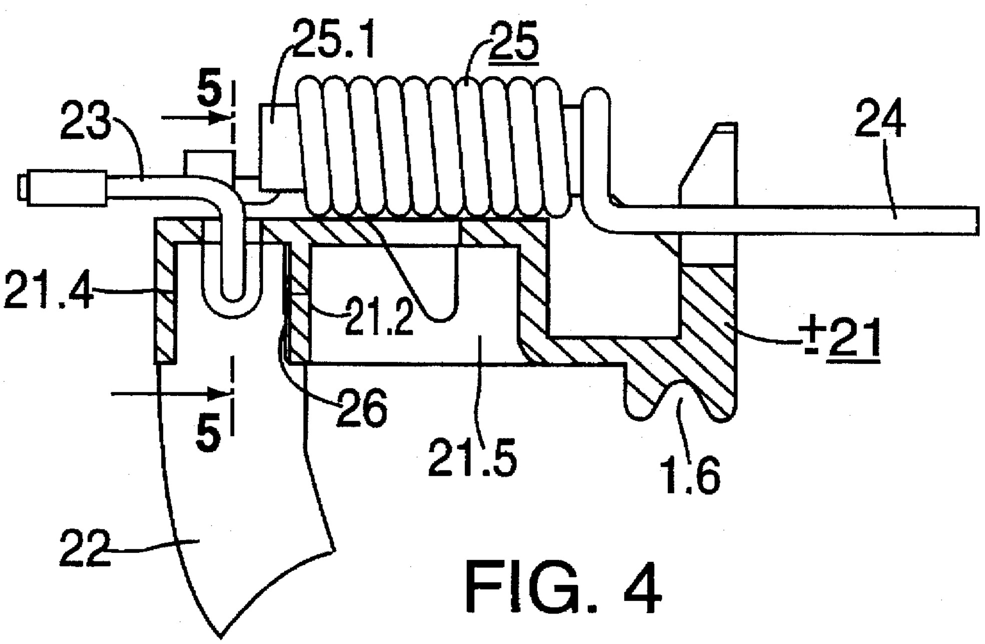
FIG. 4 illustrates a plastic hammer brash holder in a longitudinal cross section according to an embodiment of the present invention.
Figure 5:
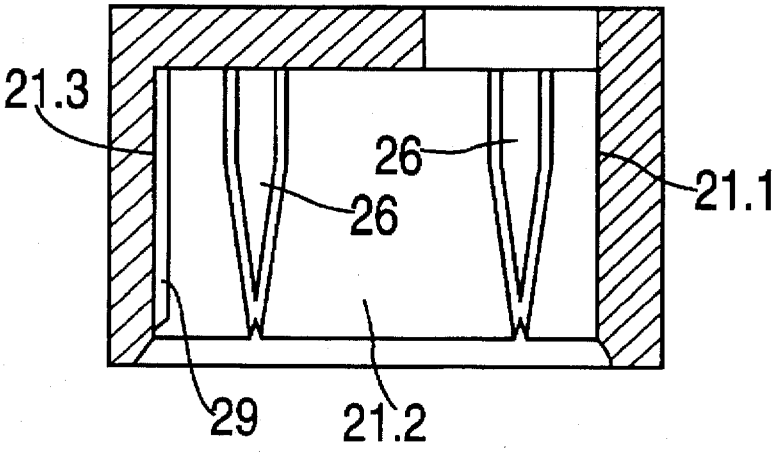
FIG. 5 illustrates the view of the receiving opening along the sectional profile line V—V in accordance with FIG. 4 when the carbon brash is removed and of the scraper ribs arranged on two contiguous side walls in a first specific embodiment.

In an axial longitudinal section, FIG. 4 depicts a plastic hammer brush holder 21, on whose top-side brush back a suppressor choke 25 is retained in a manner known from German Patent Document No. C3-28 14 009 described above. A carbon brush 22 is inserted with its upper unattached end with a clamp locking force fit from the side of the receiving opening that is open to the bottom into a rectangular receiving opening of the brush holder 21 having the diametrically opposed side walls 21.2; 21.4 or 21.1; 21.3 illustrated in cross-section.

The carbon brush 22 is clipped by a brush shunt 23 to an external connecting lead 24, which is also used at the same time for the coil winding of the suppressor choke 25 that is wound around an iron core 25.1. At its end facing away from the carbon brush 22, the plastic hammer brush holder 21 has a knife edge 21.6, which enables it to be pivoted (or rotatably supported) in a knife-edge bearing of a commutator motor so as to allow the carbon brash 22 to contact the top surface of a commutator or slip ring with its unattached end facing away from the receiving opening.

Figure 6:
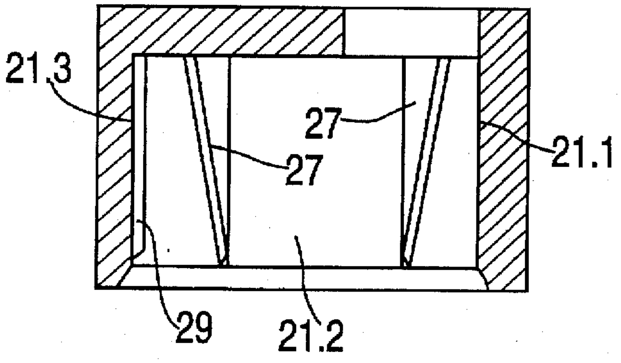
FIG. 6 illustrates an arrangement similar to that of FIG. 5, with a second specific embodiment or arrangement of the scraper ribs.

On the basis of a top view of one side wall 21.2 of the receiving opening, FIG. 5 through FIG. 8 illustrate scraper ribs arranged in accordance with various specific embodiments or arrangements of the present invention. Thus, in FIG. 5, two eccentrically displaced scraper ribs 26 are provided, which widen cortically from the starting point of insertion toward the end point of insertion. By this arrangement, virgin material of the adjacent top surface of the carbon brush 22 always works together with the scraper ribs 26 when the carbon brush 22 is pressed into the receiving opening, so that a uniformly good contact pressure can be guaranteed over the entire insertion depth. FIG. 6 shows a variation to the effect that a scraper rib that widens laterally in a triangular shape extends over the entire insertion depth, i.e., in contrast to FIG. 5, also over the last insertion region.

Figure 7:
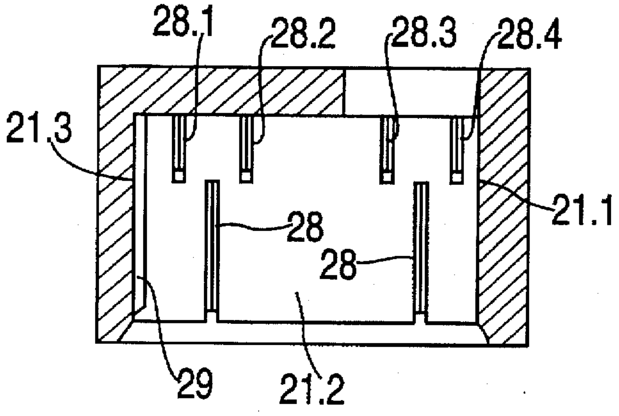
FIG. 7 illustrates an arrangement similar to that of FIG. 6, with a third specific embodiment or arrangement of the scraper ribs.
Figure 8:
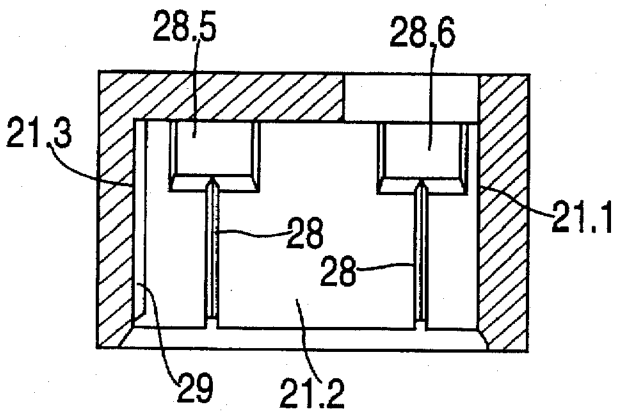
FIG. 8 illustrates an arrangement similar to that of FIG. 7, with a fourth specific embodiment or arrangement of the scraper ribs.

FIG. 7 and FIG. 8 illustrate two exemplary embodiments with scraper ribs that are displaced laterally in the area of the increasing insertion depth. In accordance with FIG. 7, a virgin pressing surface is formed by the scraper rib parts 28.1; 28.2 or 28.3; 28.4, which are laterally displaced with respect to the preceding scraper ribs 28. In the exemplary embodiment according to FIG. 8, about two thirds past the insertion depth, the scraper ribs 28 that initially run parallel to the insertion direction are relieved by scraper rib shoulders (or steps) 28.5; 28.6 which extend laterally to the previously adjacent scraper ribs 28.

In the case, as is discernable from FIG. 4, that a cross bar (or cross piece) 21.5 extends from the fight end of the plastic hammer brush holder 21 in the direction of the brush holder back extends as an advantageous supporting element up to the side wall 21.2 of the receiving opening, wall parts of the side wall 21.2 are expediently provided on both sides of the entry cross-section (or breadth) of the cross piece 21.5. The wall parts are thus elastically flexible to a small extent in the direction of the brush holder back. In the exemplary embodiments disclosed herein, only one single scraper rib 29 is provided that is preferably arranged in the middle of the shorter side wall 21.3 of the altogether rectangular receiving opening and, for example, which can be designed as the scraper rib 26 in FIG. 5 or the scraper rib 27 in FIG. 6 to widen with an increasing insertion depth.

What is claimed is:

1. A brush holder for an electrical machine, comprising:

opposite side walls forming a receiving opening for receiving a carbon brush with a clamp locking force fits at least one of the opposite side walls having at least one protruding scraper rib resting against the carbon brush, the at least one scraper rib adapted for contacting with the carbon brush to allow the at least one scraper rib to be at least one of laterally and vertically varied with respect to an increasing insertion depth of the carbon brush.

2. A brush holder according to claim 1, wherein the brush holder is a hammer brush holder.

3. The brush holder according to claim 1, wherein at least one of the at least one protruding scraper rib widens in at least one area thereof from a starting point of insertion toward an end point of insertion.

4. The brush holder according to claim 3, wherein the at least one of the at least one protruding scraper ribs comprises a cortically widening scraper rib.

5. The brush holder according to claim 3, wherein at least one of the at least one protruding scraper ribs comprises a triangularly widening scraper rib.

6. The brush holder according to claim 1, wherein the brush holder has a continuously widening breadth.

7. The brush holder according to claim 1, wherein the brush holder has a breadth that widens in steps.

8. The brush holder according to claim 1, further comprising scraper ribs that are laterally displaced from one another from a starting point of insertion toward an end point of insertion.

9. The brush holder according to claim 1, further comprising scraper ribs and scraper rib shoulders that follow one another from a starting point of insertion toward an end point of insertion.

10. The brush holder according to claim 1, further comprising a cross bar extending along the brush holder back into a middle one of the opposite side walls of the receiving opening provided with scraper ribs, the at least one scraper rib arranged at a cross-section of the cross bar in one of the opposite side walls.

11. The brush holder according to claim 1, wherein the brush holder has a maximum width of the scraper rib at an end point of insertion in a range of 5% to 50%, of a total width of a side wall receiving the scraper ribs.

12. The brash holder according to claim 1, wherein the brash holder has a maximum width of the scraper rib at an end point of insertion in a range of 7% to 10% of a total width of a side wall receiving the scraper ribs.

13. A brush holder for an electrical machine, comprising:

a pot-shaped receptacle part for receiving a carbon brush and having at least one side wall and a bottom member, the carbon brush having a shunt end provided with a brush shunt;

a clamp retaining the carbon brush in the receptacle part;

a scraper rib provided on the at least one side wall of the receptacle part, the scraper rib adapted to extend from an entry slot of the receptacle part toward the bottom member of the receptacle part with respect to one of a height and a width of the receptacle part, the scraper rib pointing into a receiving space of the receptacle part.

14. The holder according to claim 13, wherein the receptacle part has a rectangular cross-sectional shape, and wherein two scraper ribs are spaced apart from each other and are provided on at least one of the longer side walls of said receptacle part.

15. The brush holder according to claim 13, wherein the scraper rib conically extends from the entry slot toward the bottom of the receptacle part.

16. The brush holder according to claim 13, wherein at least one of the height and the width of the scraper rib is increased in steps.

17. The brash holder according to claim 15, wherein a maximum width of the scraper rib at the pot-like bottom is in a range of 5% to 50% of a width of the respective side wall of the receptacle part.

18. The brash holder according to claim 13, wherein the brash holder is a hammer brash holder.

19. The brush holder according to claim 14, wherein the scraper rib conically extends from the entry slot toward the bottom of the receptacle part.

20. The brush holder according to claim wherein at least one of the height and the width of the scraper rib is increased in steps.

21. The brush holder according to claim 15, wherein at least one of the height and the width of the scraper rib is increased in steps.

22. The brash holder according to claim 19, wherein a rise in the height and/or width of the scraper rib takes place in steps.

23. The brush holder according to claim 16, wherein a maximum width of the scraper rib at the pot-like bottom is in a range of 5% to 50% of a width of the respective side wall of the receptacle part.

24. The brash holder according to claim 19, wherein a maximum width of the scraper rib at the pot-like bottom is in a range of 5% to 50% of a width of the respective side wall of the receptacle part.

25. The brash holder according to claim 20, wherein a maximum width of the scraper rib at the pot-like bottom is in a range of 5% to 50% of a width of the respective side wall of the receptacle part.

26. The brash holder according to claim 21, wherein a maximum width of the scraper rib at the pot-like bottom is in a range of 5% to 50% of a width of the respective side wall of the receptacle part.

27. The brash holder according to claim 22, wherein a maximum width of the scraper rib at the pot-like bottom is in a range of 5% to 50% of a width of the respective side wall of the receptacle part.

28. The brash holder according to claim 15, wherein a maximum width of the scraper rib at the pot-like bottom is in a range of 7% to 10% of a width of the respective side wall of the receptacle part.

29. The brash holder according to claim 16, wherein a maximum width of the scraper rib at the pot-like bottom is in a range of 7% to 10% of a width of the respective side wall of the receptacle part.

30. The brash holder according to claim 19, wherein a maximum width of the scraper rib at the pot-like bottom is in a range of 7% to 10% of a width of the respective side wall of the receptacle part.

31. The brash holder according to claim 20, wherein a maximum width of the scraper rib at the pot-like bottom is in a range of 7% to 10% of a width of the respective side wall of the receptacle part.

32. The brash holder according to claim 21, wherein a maximum width of the scraper rib at the pot-like bottom is in a range of 7% to 10% of a width of the respective side wall of the receptacle part.

33. The brash holder according to claim 22, wherein a maximum width of the scraper rib at the pot-like bottom is in a range of 7% to 10% of a width of the respective side wall of the receptacle part.

* * * * *